UNITED STATES PATENT OFFICE.

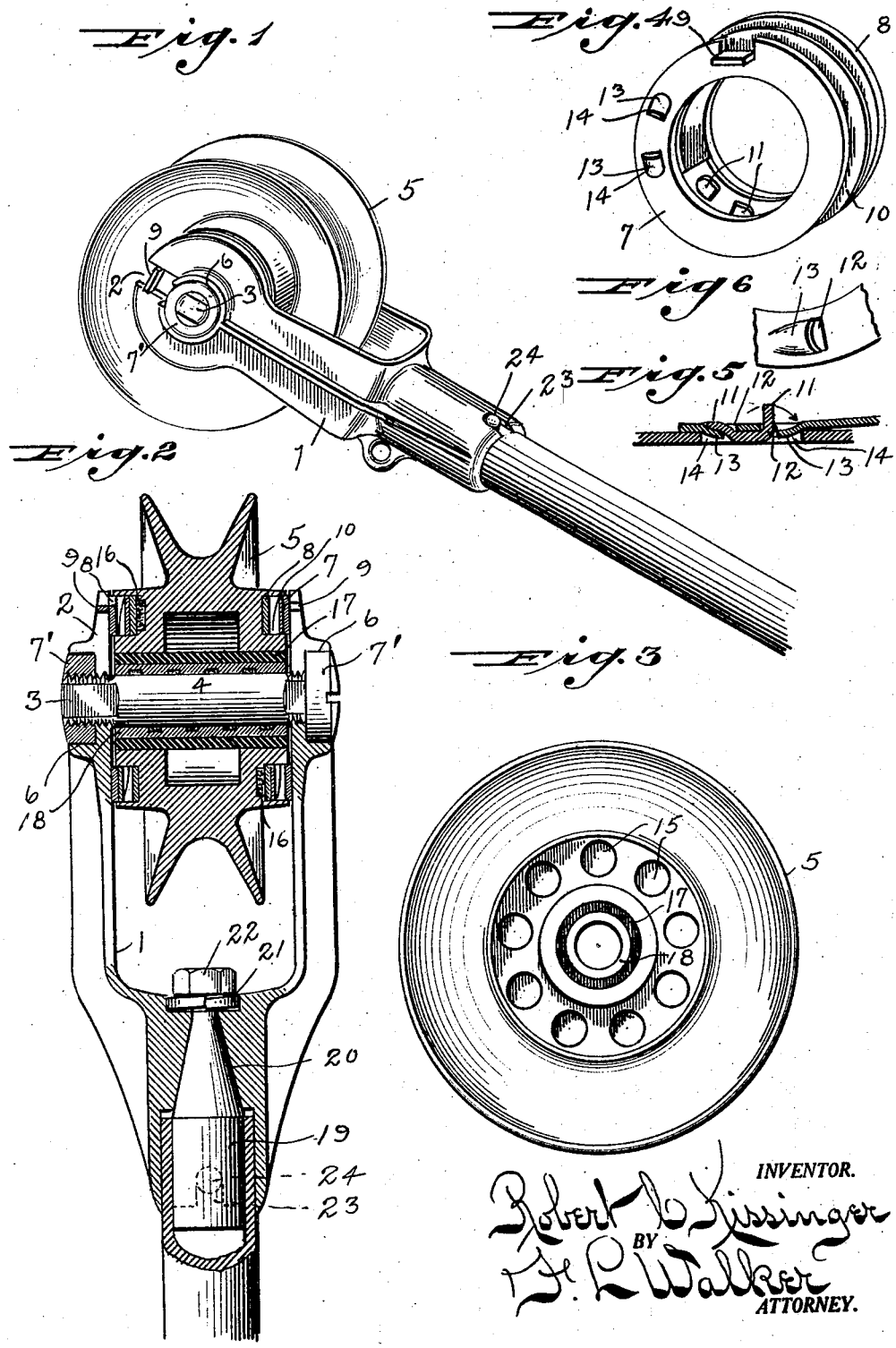

ROBERT C. KISSINGER, OF DAYTON, OHIO.

TROLLEY WHEEL.

1,418,579.                     Specification of Letters Patent.        Patented June 6, 1922.

Application filed October 26, 1921. Serial No. 510,580.

*To all whom it may concern:*

Be it known that I, ROBERT C. KISSINGER, a citizen of the United States, residing at Dayton, in the county of Montgomery and State of Ohio, have invented certain new and useful Improvements in Trolley Wheels, of which the following is a specification.

My invention relates to electric railways and more particularly to trolleys for electric traction cars.

The invention contemplates the employment of an insulating sleeve within the trolley wheel and about the bearing bushing to prevent the passing of current from the wheel through the bearing shaft to the trolley harp, and the use of an improved form of yielding or spring contact brush at each side of the trolley wheel for conducting the current thence to the trolley harp, with improved lubricating means for the contact brushes, and in addition thereto an improved form of mounting or connection of the harp with the trolley pole to obviate external projections, which might engage upon or damage the trolley wire, guy wires, or other obstructions.

The object of the invention is to simplify the structure as well as the means and mode of operation of trolley wheel mountings, whereby they will not only be cheapened in construction, but will be more efficient in use, positive in operation, uniform in action, of increased durability and unlikely to get out of repair.

A further object of the invention is to provide an improved form of electrical interconnection between the revolving wheel and the trolley harp or support, through which the current is conducted and for insulating the trolley wheel bearing, thereby obviating the arcing of current between the wheel and shaft and the incident pitting of the bearing surfaces which increases the wear and materially affect the durability of the trolley.

A further object of the invention is to provide a quick detachable connection for the harp, having the engaging devices concealed and protected, but which will effectually draw the parts into firm interlocking engagement one with the other.

A further object of the invention is to provide an improved method of forming the conducting contact brushes for the wheel.

With the above primary and other incidental objects in view as will more fully appear in the specification, the invention consists in the features of construction, the parts and combinations thereof, and the mode of operation or their equivalents as hereinafter described and set forth in the claims.

Referring to the accompanying drawings, wherein is shown the preferred, but obviously not the only embodiment of the invention, Fig. 1 is a perspective view of the assembled trolley forming the subject matter hereof. Fig. 2 is a sectional view of the wheel and its mounting. Fig. 3 is a side elevation of the wheel removed from the harp or mounting. Fig. 4 is a perspective view of one of the wheel contact brushes removed from the trolley. Fig. 5 is a detail sectional view illustrating the mode of interengaging the parts of the trolley wheel brush. Fig. 6 is a further detail of one of the brush connections.

Like parts are indicated by similar characters of reference throughout the several views.

The present invention is a further development and amplification of the trolley construction shown and claimed in my Patent No. 1247968 issued Nov. 27, 1917. As disclosed in said prior patent, the present construction involves a trolley harp 1, the arms of which are bifurcated or slotted at 2, to receive the flattened ends 3 of the trunnion shaft 4 upon which is mounted the trolley wheel 5. The outer faces of the harp arms are provided with sockets or recesses 6, interconnected by the slots 2 and within which the screw threaded flattened extremities of the trunnion shaft 4 are engaged by screw threaded collars or nuts 7.

In lieu of the continuous flat spring employed as the contact brush in the former construction, there is herein disclosed a contact brush comprising two spaced continuous annular collars 7 and 8, bearing respectively upon the arm of the harp and the lateral face of the wheel. The collar or ring 7 is provided with an out-turned tongue or lug 9, which engages within the slot 2 of the harp arm, to prevent relative rotation. The rings or collars 7 and 8 are interconnected one with the other by an intermediate split collar or spiral 10, of resilient material, which exerts a constant pressure upon the rings or collars 7 and 8, maintaining uniform bearing pressure upon the wheel and harp respectively. While these members may be interconnected by brazing, welding, soldering or other such means, there is shown in the drawings, particularly Figs. 5 and 6 a mode of interconnection, which while inexpensive and capable of being rapidly performed will permit the bearing rings or collars 7 and 8 to be worn quite thin, without affecting the connection between such members and the intermediate resilient member 10. To this end tines or tongues 11 of material, are struck up from the rings or collars 7 and 8. There are preferably two of these projections struck up in opposite directions, that is they are turned from the plane of the ring or collar each toward the other, and inwardly disposed in relation with the bearing faces. The adjacent ends of the intermediate helical resilient collar 10 are formed with spaced slots 12, to receive these tines or fingers 11, and the material adjacent to these slots 12 is depressed or projected out of the normal plane of the member to form depressions 13 to receive the tines or fingers 11 when the latter are clenched, within the slot 12. The tines or fingers 11 being inserted through the openings 12, in the intermediate member as shown in Fig. 5, they are bent downwardly and away from each other as indicated therein, overlapping the depressed portions of the intermediate member 10, which in turn seat within the recesses or openings 14 from which the tines or fingers 11 were originally formed. This interengagement of the depressed portion 13 within such openings 14 forms an interlocking connection auxiliary to the clenching of the tines or fingers. Such construction obviates the use of rivets, which in time would be worn off, permitting the parts to separate one from the other. The construction as heretofore described and as shown in Figs. 5 and 6 enables the bearing collars or rings 7 and 8 to be worn almost entirely through before affecting the interlocking joint.

The use of these spaced bearing rings resiliently or yieldingly connected one with the other, insures a wide and ample contact surface with both the wheel and the harp. Inasmuch as the innermost bearing ring 8 or that engaging the wheel, is subjected to wear, the bearing face of the wheel is provided with a succession of depressions or pockets 15, overlaid by the ring 8, within which depressions or pockets is deposited lubricating material, such as graphite in a paste or semiform or other lubricating material. These deposits 15 of lubricant afford a constant and uniform supply to the bearing surface of the brush ring 8 upon the wheel and materially increase the life of the parts.

Heretofore some difficulty has been experienced, particularly when the brush bearings were not ample or in perfect contact, due to the tendency of the current to seek the path of least resistance and so pass through the bearing shaft. There being a slight clearance between the wheel and the shaft necessary to the free rotation of the wheel thereon, there has been found some tendency of the current to arc, and hence burn the surface of the shaft, causing minute pitting of the bearing surface and shaft. This pitting or roughening of the surface increases the rapidity with which the bearing will wear and materially decreases the life of the wheel and shaft. To obviate this difficulty in the present instance, there is provided a bushing or sleeve 17 of fiber or other insulating material fixedly secured within the hub of the wheel 5, and within such fiber insert or insulating bushing, there is fixedly mounted a bearing sleeve or bushing 18. In the drawing, the bearing sleeve or bushing has been provided with grooves 19 to receive lubricant. By the use of the insulating sleeve or bushing 17, the bearing of the sleeve 18 and the trunnion shaft 4 are fully insulated from the wheel proper, so that no current can pass from the wheel to the shaft, but the current must pass through the brushes before mentioned from the wheel to the harp.

A trolley should be capable of being easily and quickly detached and replaced upon the trolley pole. Furthermore, this replacement should be capable of accomplishment with the use of few tools and with great rapidity as it is sometimes necessary for the car crew to replace the trolley while on remote parts of the traction system. It is furthermore desirable that the trolley connection involves no projections, offsets or obstructions which might catch upon or cause injury to the trolley cable or supporting guys. It is customary to use a length of tubing as a trolley pole. Such a trolley pole is shown at 18 in the drawing. For convenience of manufacture, a plug 19 is fitted in the end of the tubular trolley pole 18 by welding, brazing or by spinning. The projecting portion of the plug 19 is tapered as at 20, and the socket in the end of the trolley harp is correspondingly tapered to receive such portion of the plug 19. The extremity of the insert 19 beyond the tapered portion 20, comprises a screw threaded stud projecting through an opening in the inner end of the tapered socket of the harp where it receives a spring friction washer 21, and a nut 22, by which the tapered portion of the trolley pole is drawn into firm engagement within the socket of the harp. The end of the harp is provided with a notch 23, within which engages a short stud or lug 24 upon the trolley pole to position the trolley harp upon the pole in predetermined relation and prevent rotation. The stud 24 is sufficiently short that it will not project beyond the surface of the harp socket. The interengagement of the stud 24 within the notch 23 serves to aline the trolley upon the pole in such relative position that the plane of rotation of the wheel will be vertical.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect, and the invention is therefore claimed in any of its forms or modifications within the legitimate and valid scope of the appended claims.

Having thus described my invention, I claim:

1. The combination with a trolley wheel and mounting therefor including a shaft upon which the wheel rotates, of a bearing bushing in said wheel and a body of insulating material electrically separating the bearing bushing from the main body of the wheel whereby electric current will be prevented from passing from the wheel to the shaft, and conductor brushes engaging the wheel for the conduct of the current independent of the shaft.

2. As an article of manufacture, a trolley wheel, a bushing of insulating material in said wheel and a bearing bushing within said bushing of insulating material.

3. As an article of manufacture, a trolley wheel, and a bearing bushing therein, electrically isolated from the main body of the wheel.

4. In a trolley, the combination with a trolley wheel and a mounting therefor, of a trolley pole having a tapered extremity, a like tapered seat within the mounting, a threaded stud at the apex of the tapered extremity and a clamp nut coacting therewith to draw the parts into firm engagement.

5. In a trolley, the combination with a trolley wheel and a bifurcated harp in which the wheel is mounted, of a trolley pole having a tapered extremity, and a like tapered socket formed in the shank of the harp within which the tapered extremity of the pole extends with its apex projecting intermediate the furcations of the harp and a locking member engageable with the pole extremity intermediate the harp arms.

6. The combination with a trolley wheel and a bifurcated harp therefor, of a trolley pole upon which the harp is telescopically mounted and means within the bifurcation of the harp for detachably engaging the pole.

7. The combination with a trolley wheel and a harp therefor, having therein a tapered socket to receive the extremity of a trolley pole, a pole having such tapered extremity with which the harp is telescopically engaged, a recess in the wall of the harp socket and a projection carried by the pole for engagement with the recess to insure the positioning of the wheel with its plane of rotation vertically disposed and means for relatively drawing the harp and pole longitudinally to insure firm seating of the tapered extremity of the pole within the tapered socket.

8. The combination with a trolley wheel and a mounting therefor, of a conductor brush interposed between the mounting and the wheel, comprising two continuous annular contact members and an intermediate resilient helical conductor connecting the contact members one with the other.

9. The combination with a trolley wheel and a mounting therefor, of a conductor brush interposed between the mounting and the wheel comprising a bearing ring engaging the lateral face of the wheel, and a yielding spring member pressing the ring into contact with the wheel, the bearing surface of the wheel having therein a plurality of depressions to contain lubricant, said depressions being overlaid by said contact ring.

10. The combination with a trolley wheel and a mounting therefor, of a conductor brush interposed between the mounting and the wheel comprising a continuous flat bearing ring engaging the lateral face of the wheel, a helical spring connected to said ring and conducting the current thence to the mounting.

11. The combination with a trolley wheel and a mounting therefor, of a conductor brush interposed between the mounting and the wheel, comprising a contact ring engaging the lateral face of the wheel, a spring member engaged therewith and exerting pressure upon said bearing ring, said spring member having spaced perforations therein and depressions therein contiguous to said perforations, and tines struck up from said ring for insertion in said perforations, leaving openings in the ring into which the depressions of the spring member engage the tines being in turn clenched in said depressions.

In testimony whereof, I have hereunto set my hand this 15th day of October A. D. 1921.

ROBERT C. KISSINGER.

Witnesses:
WM. A. SWANEY,
A. P. MERCER.